United States Patent Office 3,283,121
Patented Nov. 1, 1966

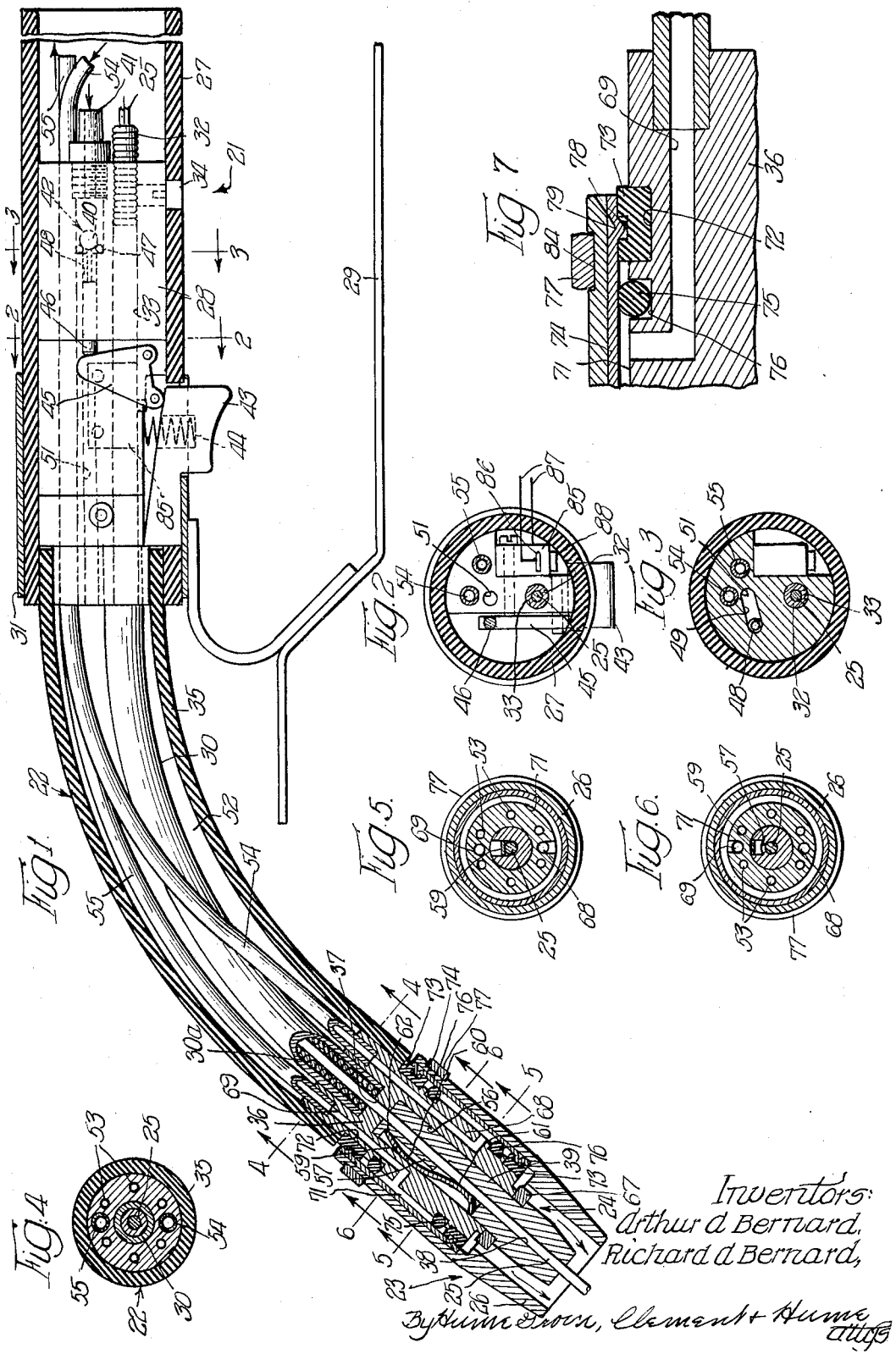

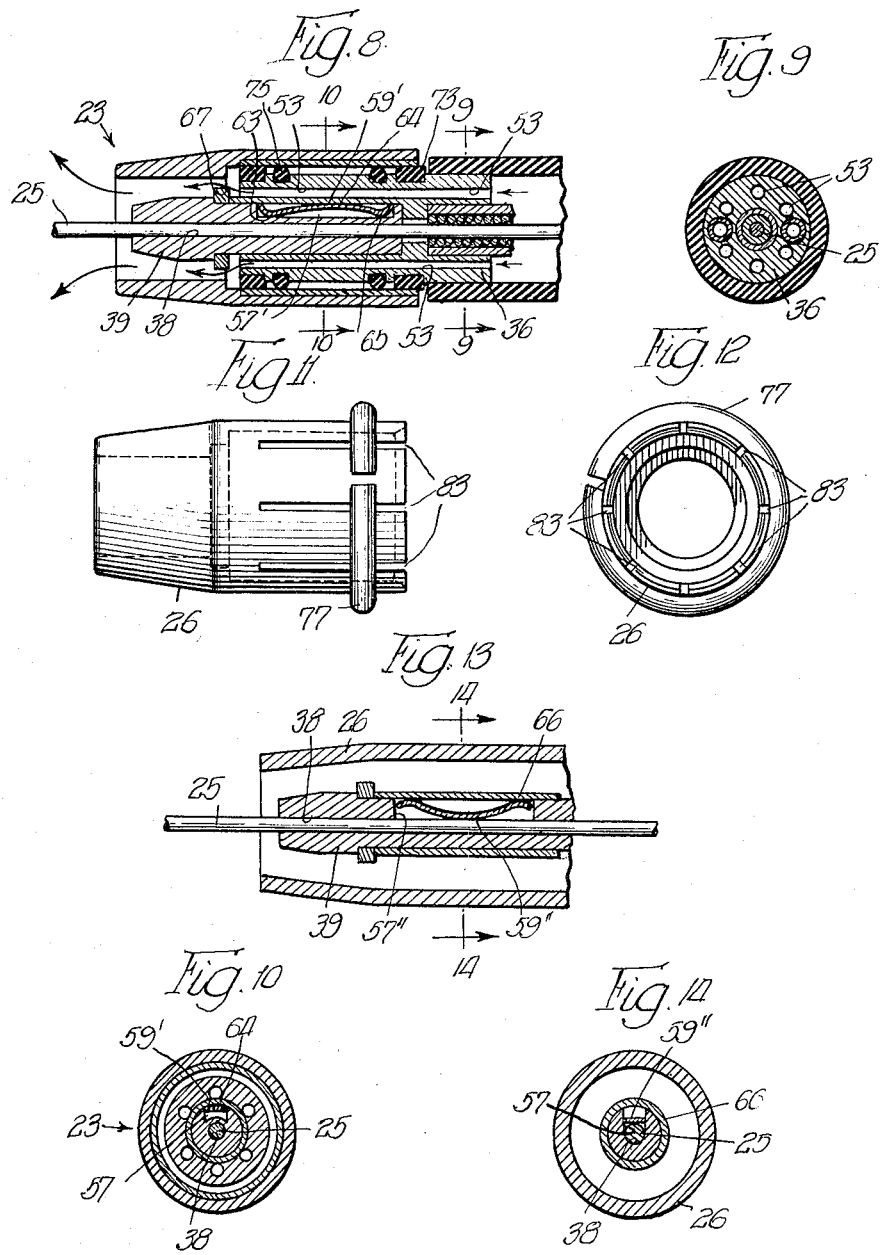

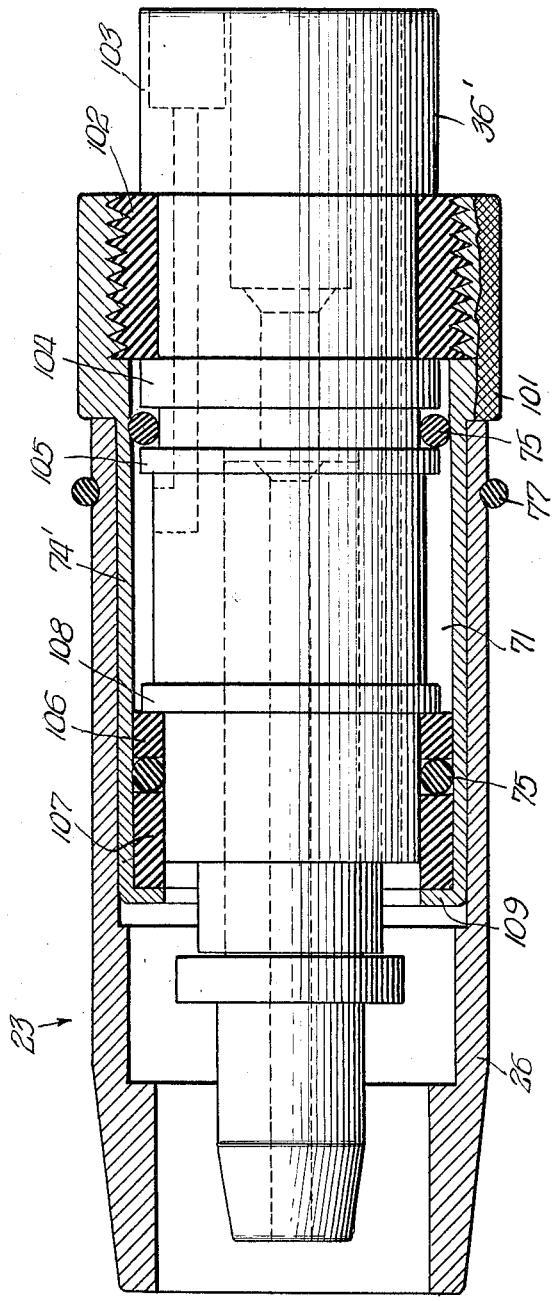

3,283,121
ARC WELDING GUN
Arthur A. Bernard and Richard A. Bernard, both of Chicago Heights, Ill., assignors to Bernard Welding Equipment Company, Beecher, Ill., a corporation of Illinois
Filed July 21, 1965, Ser. No. 477,351
19 Claims. (Cl. 219—130)

This invention relates to arc welding and more particularly to an improved arc welding gun for applying continuous lengths of consumable electrode of the solid, tubular and composite wire types in larger sizes than are currently being used and at much higher than conventional rates of speed.

This application is a continuation-in-part of application Serial No. 446,607, filed April 8, 1965, by the same two inventors, and now abandoned.

There has been a real need in industry for an arc welding gun with sufficient capacity for applying the above-mentioned types of electrode with higher than conventionally used welding currents to substantially lower the cost of welding by converting more pounds of the electrode metal into weld metal per unit of time.

The main problems in developing such a high capacity gun have been two-fold, namely, (1) as welding current is increased, the rate that welding electrode is fed through the gun to the arc in inches per minute is increased, necessitating a more efficient method of making welding current contact to the surface of the faster moving electrode, and, (2) preventing the gun from being destroyed by overheating caused by the higher volume of heat radiated to the gun from the higher volume of arc heat.

It will aid in understanding the objects of this invention to briefly consider several significant facts regarding ultra-high current welding arcs. For example, a 650 ampere arc at 35 volts melts and converts base metal and electrode metal into weld metal at a rate of about three quarters of a pound per minute, which amounts to about forty five pounds per hour. This high volume of heat would normally occur within three-eighths inch from the contact member in which welding current contact is made to the electrode, and, at about the same closeness to the gas nozzle from which the annular curtain of gas for shielding the arc flows. Therefore, both of these portions of a welding gun can become heated to a red hot temperature within three minutes after the welding arc is struck, and be melted and literally drip from the gun within five minutes when such high currents are used, unless a very efficient means is used to keep these parts cooled below the destructive temperatures.

The main object of this present invention is, therefore, to more efficiently prevent destructive overheating of the welding current contact member and the gas nozzle from high welding current arcs by providing improved means for channeling a coolant through the welding gun to absorb heat from the current contact member and the gas nozzle.

Another equally important object of the present invention is to provide a more efficient method of attaching the welding current contact member and the gas nozzle to the head member of the welding gun. Heretofore the method generally used for connecting these two parts has been by threaded connections which has two serious disadvantages. First, when removed from the gun for the purpose of cleaning splashed arc metal and condensed vapor metal from within the gas nozzle and from the surface of the contact member, small loose droplets of metal can be overlooked and become lodged in the threads when the current contact is screwed back onto the gun. A few such mishaps not only destroy the threads on the contact member and gas nozzle but the threads on the expensive gun as well. Secondly, as is generally known, any threaded connection which goes through many cycles per hour of being highly heated and expanded and then cooled and contracted becomes loose. Consequently, when the threaded connection becomes loose between the welding current contact member and the head member of the gun, resistance heating develops which adds to the heat radiated to the gun from the arc. Moreover, a loose threaded connection between the gas nozzle and the head portion will not support an efficient transfer of heat from the gas nozzle to the head member and results in a build-up of heat in the gas nozzle. Therefore, to eliminate the disadvantages caused by threaded connections, the present invention uses the compression force produced by a spring within a telescoped connection for holding the welding current contact member to the head member of the gun, and, retains tightness between the bore of the gas nozzle and a coolant channel sleeve over which the gas nozzle telescopes by providing narrow slots in the barrel of the nozzle so that a spring which encircles the outer periphery contracts the circumference to produce tightness between the inner surface of the gas nozzle and the outer wall of the coolant channel.

The sleeve referred to fits over and cooperates with the head member to form the annular channel for high pressure coolant. The width of the annular channel is substantially as wide as the length of the telescoped portion of the current contact member and the gas nozzle, normally about one inch. The inside surface of the telescoped portion of the gas nozzle and the outside surface of the telescoped portion of the current contact member are each typically within one-fourth inch from the annular coolant channel. In other words, the high pressure coolant is about one-third closer to the surfaces of the current contact member and the gas nozzle than is the arc located at the tip of the electrode, and the surface are of the annular coolant channel is several times larger than the areas of these two parts which are directly subjected to heat radiation from the arc. Significantly, this arrangement makes possible the efficient use of a single cooling channel to cool both the gas nozzle and the current contact member.

It is very essential in the construction of arc welding guns that the gas nozzle be electrically insulated from the head member through which welding current is conducted to the welding current contact member. Otherwise, if the gas nozzle is accidentally brought in contact with the workpiece, an arc will form between the gas nozzle and the workpiece which will definitely destroy the nozzle and quite possibly the gun as well. Therefore, another of the main objects of this invention is to provide pressure-tight, electric insulating means between the coolant channel sleeve and the head member so that the gas nozzle telescoped over the coolant channel sleeve is not a portion of the welding current circuit. The means provided by this invention involve two non-metallic bushings which electrically insulate the coolant channel sleeve and the head member from each other and two O rings which prevent leakage of the high pressure coolant from the coolant channel.

Another problem which exists in conventional water-cooled welding guns is that no easy and inexpensive provision has been made for removing mineral deposits which build up in and plug the channels through which the cooling water is circulated under pressure. As is generally known, most water contains calcium which separates from the water and accumulates on heated surfaces with which the water comes in contact. Therefore, another object of this invention is to provide an inexpensive and quick way of removing such deposits from the above-mentioned circular channel by simply removing and discarding the inexpensive outer coolant channel sleeve referred to above, removing the lime deposits from within the channel, and installing a new sleeve.

Another important feature of this present invention is that the walls which define the annular coolant channel are not formed by either the exterior surface of the current contact member or by the interior surface of the gas nozzle. This feature is important because either the contact tube or the gas nozzle or both of these parts can be removed from the gun for removing weld metal spatter without shutting off the coolant, and also, without having coolant drain from the coolant system. The provision of the spring-loaded telescoped connections, as mentioned above, provides ample tightness between the parts to insure efficient conduction of heat from the current contact member and the gas nozzle to the head member and the sleeve which form the walls of the circular channel.

Another equally important object of this invention is to provide a much more efficient means for making welding current contact between the welding current contact member and the electrode, so that higher than conventionally-used welding current can be efficiently conducted from the contact member to the electrode with the electrode traveling at greater feed rates to satisfy the higher burn off rates which the higher welding currents produce. The conventional method of making welding current contact between the current contact member and the electrode is to feed the electrode through a contact member bore which is larger in diameter than the diameter of the electrode and to rely on a curvature of the electrode for a spring contact within the bore. This is a tenuous method because it relies on some curvature remaining in the wire as it is withdrawn from the coil or the spool source. In many cases, the feed rolls of the electrode feeding machine which withdraw the wire from its source and feed it through the gun to the arc actually remove the curvature put into the wire when coiled at the time of manufacture. In the present invention, positive and efficient electrical contact for the flow of welding current between the welding current contact member and the electrode is achieved by a spring which extends into the welding current contact member bore. This spring applies pressure against the electrode, forcing the opposite side of the electrode into sliding contact with the interior wall of the contact member bore.

These and other features and objects of the present invention will be better understood by reference to the following detailed description and to the accompanying drawings wherein:

FIGURE 1 is a side view of the complete arc welding gun in partial cross section.

FIGURE 2 is a cross-sectional view taken at 2—2 of FIGURE 1.

FIGURE 3 is a cross-sectional view taken at 3—3 of FIGURE 1.

FIGURE 4 is a cross-sectional view taken at 4—4 of FIGURE 1.

FIGURE 5 is a cross-sectional view taken at 5—5 of FIGURE 1.

FIGURE 6 is a cross-sectional view taken at 6—6 of FIGURE 1.

FIGURE 7 is an enlarged view of a portion of FIGURE 1.

FIGURE 8 is a cross-sectional view illustrating another form of the invention.

FIGURE 9 is a cross-sectional view taken at 9—9 of FIGURE 8.

FIGURE 10 is a cross-sectional view taken at 10—10 of FIGURE 8.

FIGURE 11 is a side elevational view of a gas nozzle construction in accordance with the present invention.

FIGURE 12 is an end elevational view of the gas nozzle construction shown in FIGURE 11.

FIGURE 13 is a cross-sectional view illustrating the manner in which the invention is carried out when the current contact member and the gas nozzle are of extended length.

FIGURE 14 is a cross-sectional view taken at 14—14 of FIGURE 13.

FIGURE 15 is a side view partially in elevation and partially in cross-section illustrating another form of construction of the head portion in accordance with the invention.

Referring to FIGURE 1, it is seen that the arc welding gun consists broadly of a main body portion 21, an intermediate portion 22, and a head portion 23. The head portion 23 includes a water cooled head assembly 24, which guides the mechanically-fed electrode 25 to the welding arc and in which welding current contact is made with the electrode 25, and a gas nozzle 26 which forms and directs an annular stream of shielding gas around and over the welding arc zone. While the present invention is primarily concerned with the head portion of the arc welding gun, it will aid in understanding this invention and its structural and operational environment to briefly consider first the nature of the body and intermediate portions 21 and 22 and their relation to the head portion 23.

The main body portion 21, as additionally illustrated in FIGURES 2 and 3, includes an electrically non-conductive tubular handle casing 27 in which is mounted a generally cylindrical body member 28 which is also electrically non-conductive. A metal shield 29 is affixed to a sleeve 31 secured on the handle casing 27 for protecting the hand of the welding operator against the radiant heat of the welding arc.

The consumable arc welding electrode 25 is mechanically fed to and through the gun by any conventional electrode feeding machine. The electrode 25 travels to the gun through a conventional flexible conduit 32 which is connected to the body member 28 by insertion into a bore 33 in which it is anchored by a set screw 34. The electrode 25 passes through the bore 33 into a copper tube 30 within the tubular neoprene member 35 of the intermediate portion 22. The copper tube 30 and bore 33 are preferably lined with a replaceable hard steel spring 30a or nylon tube to prevent wear. The forward end of the tube 30 is centrally received in the head member 36 of the head assembly 24, and the electrode passes through a channel 37 in the head member 36 into a central bore 38 in the current contact member 39 which guides the electrode 25 to the welding arc and in which, as will be described with more particularity further on, the electrode 25 is energized with welding current.

Shielding gas for blanketing the welding arc is supplied to the gun by a flexible hose (not shown) which is connected to a stem 41 threaded into the body member 28. From the stem 41, the gas enters a valve 42 which is actuated by a trigger 43 conveniently located for ease of operation by the welding operator. The particular construction of the valve 42 does not form a part of the present invention, and, therefore, it will not be described in detail. It suffices to note that pressing the trigger 43 against the force of a spring 44 moves a pivotal lever 45 against a pin 46 which, in turn, forces a stainless steel ball 40 off of an O ring valve seat 47, permitting the shielding gas to flow into a channel 48, more clearly illustrated in FIGURE 3. From the channel 48, the shielding gas flows into a channel 49 and then into a channel 51 from which it spills into the gas-tight chamber 52 formed by the tubular member 35. The shielding gas flows from the chamber 52 through six channels 53 in the head member 36 from which it is directed to the welding area by the gas nozzle 26, as will be described with more particularity further on.

Coolant, generally water under pressure, is conducted to the welding gun by a flexible hose (not shown) which is connected to the copper inlet tube 54 extending through the body member 28 and the interior of the tubular member 35. The forward end of the coolant inlet tube 54 is received in the head member 36 for introduction into an annular cooling chamber in the head assembly 24, as described with particularity further on. From the cooling chamber, the heated coolant is conducted through the copper outlet tube 55 which extends from the head member 36 through the interior of the tubular member 35 and through the body member 28 to another flexible hose (not shown) which directs the coolant to a drain or back to the coolant source for heat removal and recirculation.

Welding current is conducted to the welding gun by a pair of cables (not shown) which are electrically connected in parallel and preferably encased in the two lengths of flexible hose which conduct coolant to and from the gun. The two welding current cables are connected to the respective copper coolant tubes 54 and 55, each of which thus conducts approximately one-half of the total welding current used to produce the welding arc. As previously indicated, the forward ends of the coolant tubes are connected to the head member 36. To insure an efficient electrical connection with the head member 36, the coolant tubes 54 and 55 are silver-soldered to the head member. It should be noted that the neoprene tubular member 35 serves to electrically insulate the welding current conducting coolant tubes 54 and 55 as well as forming a gas chamber leading to the head member 36.

Referring now primarily to FIGURES 1 and 4 through 7, and giving specific consideration to the head portion 23 with which the present invention is principally concerned, it is seen that the cylindrical head member 36 is tightly secured in the forward end of the tubular member 35 and is provided with a longitudinal bore 56 to slidably receive a major portion of the cylindrical current contact member 39. The head member 36 and the current contact member 39 cooperate to form a serial portion of the welding current circuit from the current conducting coolant tubes 54 and 55 to the electrode 25. Accordingly, both members 36 and 39 are preferably fabricated of copper for maximum electrical conductivity.

The current contact member 39 is provided with a central longitudinal bore 38 which guides the electrode 25 to the welding arc and in which welding current contact is made with the electrode 25. Since the forward end of the current contact member 39 is close to the welding arc, it is necessary that the current contact member be readily detachable from the head member 36 for cleaning or replacement purposes. However, it is also very important that there be firm, efficient electrical contact between the interior wall of the bore 56 of the head member and the outer surface of the current contact member 39 and also between the interior wall of the bore 38 of the current contact member 39 and the surface of the electrode 25, particularly when employing unusually high welding currents, in order to avoid resistance heating at these areas of contact. Moreover, it is also important that the means provided for maintaining tightness at this area be adapted to accommmodate expansion effects caused by the arc heat.

As previously mentioned, it is an important object of the present invention to provide means for maintaining tight electrical contact in the contact areas just referred to. This object is accomplished in the following manner in the form of the invention shown in FIGURE 1. A longitudinal groove or recess 57 is provided in the portion of the current contact member telescoped or slidably inserted into the head member bore 56. The forward portion of the groove 57 intersects the current contact member bore 38 to expose the electrode 25. A leaf spring 59, which is substantially S-shaped or which has at least a slight upturned forward end, is mounted in the groove 57 as illustrated in FIGURE 1. The diameter of the inserted portion of the current contact member 39 is a few thousandths of an inch less than the internal diameter of the head member bore 56. The curvature of the leaf spring 59 is such that, when the current contact member 39 is inserted into the head member bore 56, the leaf spring is compressed and applies approximately 75 pounds force at area 60 and a corresponding total of apprpximately 75 pounds force in the opposite direction at areas 61 and 62. The 75 pound compression force of the leaf spring 59 is exemplary and other compression force magnitudes may be found suitable. It is important to understand that in FIGURE 1, the leaf spring 59 accomplishes the dual purpose of (1) urging the opposite surface of the electrode 25 against the interior wall of the current contact member bore 38 to establish and maintain positive electrical sliding contact between the current contact member 39 and the electrode 25, and (2) forcing the opposite outer surface of the current contact member 39 against the interior wall of the head member bore 56 to establish and maintain positive electrical contact between the current contact member 39 and the head member 36 and to firmly hold the inserted portion of the current contact member 39 within the head member bore 56.

In the modified form of the invention shown in FIGURES 8, 9, and 10, the groove 57' provided in the inserted portion of the current contact member 39 does not intersect the current contact member bore 38, and the leaf spring 59' exerts force at the areas 63, 64, and 65 but exerts no force on the electrode 25. The function of the leaf spring 59' is to force the opposite outer surface of the current contact member 39 against the interior wall of the head member bore 56 to establish and maintain positive electrical contact between the current contact member 39 and the head member 36 and to firmly hold the inserted portion of the current contact member 39 within the head member 36.

There are welding applications in which it is desirable to extend the length of the gas nozzle and the current contact member to facilitate welding in deep pockets and crevices. No undesirable conditions are produced when the length of the gas nozzle is increased. However, poor welding results are generally produced when the length of the welding current contact member is extended unless provision is made to make welding current contact between the current contact member and the electrode close to the arc end of the lengthened current contact member so as to minimize the extent of resistance heating by reducing the length of electrode through which current is conducted. The modified form of the invention illustrated in FIGURES 13 and 14 accomplishes this purpose by providing an extended gas nozzle 26 and an extended current contact member 39 having a longitudinal slot or recess 57" which intersects the current contact member bore 38. The leaf spring 59" exerts compressive force against the electrode 25 and against thin-walled tube 66 fitted over the current contact member 39', thereby urging the electrode 25 slidably against the interior wall of the current contact member bore 38 to establish and maintain positive electrical contact between the current contact member 39 and the electrode 25. The tube 66 is thin-walled in order not to interfere with the flow of gas through the gas nozzle 26.

As previously noted, the shielding gas is conducted through the head member 36 by six channels 53 provided in the head member. As best illustrated in FIGURE 8, the six gas streams emerge from the forward ends of the channels 53 and impinge against a baffle 67 mounted on the current contact member 39. The baffle 67 breaks up the six separate gas streams and merges them into a single, annularly-shaped stream which is directed around the welding arc by the mouth of the gas nozzle 26. The baffle 67 also serves to shield the openings of the gas channels 53 to prevent them from becoming plugged by molten metal splashed up into the gas nozzle 26 from the welding area. As illustrated in FIGURES 5 and 6, the six gas channels 53 are arranged in a circular manner and spaced approximately 60 degrees from each other. Two coolant conduits 68 and 69 are spaced at approximately 30 degrees between four of the gas channels 53. It should be understood that while six gas channels are illustrated, a greater or lesser number might also be used.

The annular cooling chamber or channel 71 is provided in the head assembly 24 in the following manner, as best illustrated in FIGURE 7. A pair of longitudinally-spaced, annular grooves 72 are provided in the cylindrical outer surface of the head member 36. In each of the annular grooves 72, there is mounted an electrically-insulating annular bushing 73. The two bushings 73 are preferably machined from a tubular form of densely compressed asbestos fiber impregnated with a phenolic type resin. A thin-walled brass sleeve 74 is tightly mounted on the bushings 73 to complete the annular cooling chamber 71. A pair of O rings 75 are mounted in annular grooves 76 to seal the ends of the cooling chamber 71.

It has been found the O rings 75 can be dispensed with if the bushings are made of a slightly compressible material such as silicon rubber or vulcanized fiber and cemented in the grooves 72 with a cement such as liquid silicon rubber in which case the bushings 73 perform both as electrical insulators and as the cooling chamber sealing means.

As will be more particularly described further on, the nozzle 26 in the form of the invention shown in FIGURE 1 is held tightly on the brass sleeve 74 by an annular spring 77, and considerable pulling and twisting force is required to remove the nozzle 26. Accordingly, to anchor the brass sleeve 74 onto the bushings 73 so that it will not be pulled off or axially dislocated when the nozzle 26 is removed for cleaning purposes or the like, the bushings 73 are provided with grooves or indents 78 into which crimped detents 79 in the sleeve 74 are engaged, as best illustrated in FIGURE 7. When the O rings 75 are dispensed with, the recesses 78 are filled with bonding cement.

The coolant is conducted to the forward end of annular cooling chamber 71 from the inlet tube 54 through the conduit 68 provided in the head member 36. The coolant circulates through the annular cooling chamber and is removed at the rearward end of the cooling chamber and conducted to the outlet tube 55 by the conduit 69 provided in the head member 36.

As previously mentioned, lime deposits tend to accumulate in the cooling chamber when water is used as the coolant. To remove these lime deposits from the annular cooling chamber 71 in the present invention, the inexpensive brass sleeve 74 which forms the outer wall of the cooling chamber 71 is slit open longitudinally by filing or grinding, removed and discarded. The lime deposits are removed from the cooling chamber, and a new brass sleeve is anchored in place on the bushings 73.

Referring now primarily to FIGURES 11 and 12, the type of gas nozzle construction used in the form of the invention shown in FIGURE 1 is more clearly illustrated. The rearward portion of the nozzle 26 is provided with a plurality of circumferentially-spaced, longitudinal slots 83 which extend forwardly from the rearward edge of the nozzle 26 to make the rearward portion of the nozzle radially-contractible. Such slots are provided in certain conventional gas nozzles for holding the nozzle onto the head assembly. However, the mere provision of such slots and bending the slotted portions of the nozzle inwardly to hug the head assembly is of limited value since for maximum heat conductivity the gas nozzles are generally made of copper which has very little spring value. Moreover, when such conventional nozzles becomes highly heated, the rearward portion of the nozzle expands circumferentially, permitting the nozzle to fall off of the gun. In accordance with the present invention, an annular spring 77 is mounted on the rearward portion of the nozzle 26 to compress it into tight contact with the brass sleeve 74. The spring 77 may be round as illustrated in FIGURES 11 and 12 or flat as illustrated in FIGURES 1 and 7. Preferably an annular retaining recess 84 is provided for the spring 77 in the periphery of the radially-contractible rearward portion of the nozzle as illustrated in FIGURE 7.

It is important to note that the annular cooling chamber 71 is typically an inch or more in length and overlies most of the inserted portion of the current contact member 39 as well as underlying most of the telescoped portion of the gas nozzle 26. Preferably, the brass sleeve 74 is about 1/32 inch thick so that the interior wall of the gas nozzle 26 which is held tightly against the brass sleeve 74 by the spring 77 is only 1/32 inch distant from the coolant circulated through the cooling chamber 71. The thickness of the portion of the head member 36 from the interior wall of its longitudinal bore 56 to the exterior surface of the head member 36 which forms the inner wall of the annular cooling chamber is typically 1/4 inch. Hence, the high volume of arc heat radiated to the gas nozzle 26 and the current contact member 39 is constantly being removed by a broad band of circulating coolant presenting a large surface area for heat absorption in close proximity to substantial surface areas of the high-heat-conductivity nozzle 26 and current contact member 39. The tightness of contact between the gas nozzle 26 and brass sleeve 74 and between the current contact member 39 and the head member 36 effects the conduction of heat to the cooling chamber 71 acting as a heat sink.

In FIGURE 15, there is shown another preferred form of the head portion 23. In this instance, the sleeve 74', which forms the outer annular wall of the cooling chamber 71, includes a knurled collar 101 at its rearward end. The collar 101 is provided with internal threads so that the sleeve 74' can be screwed onto a threaded annular bushing 102 which is mounted on the head member 36' between collars 103 and 104 provided in the rearward portion of the head member 36'. As in FIGURES 1 and 8, a pair of O rings 75 are mounted on the head member for sealing the ends of the annular cooling chamber 71. One of the O rings 75 is confined between the collar 104 and a collar 105. The other O ring 75 is confined between a pair of annular bushings 106 and 107 mounted on the forward portion of the head member 36'. When the sleeve 74' is threaded onto the bushing 102, the forward O ring is compressed between the bushings 106 and 107 by the force which is developed between another collar 108 provided on the head member 36' and an inwardly-extending annular flange 109 provided on the forward end of the sleeve 74'. The bushings 102 and 106 protrude radially beyond the outermost surfaces of the head member 36' so as to cooperate with the sleeve 74' and the head member 36' to form the annular cooling chamber 71 which is sealed at each end by the O rings 75. The bushings 102, 106, and 107 are preferably made of molded asbestos impregnated with resin to insure electrical insulation of the head member 36' from the sleeve 74'. The gas nozzle 26 is telescoped over the forward end of the sleeve 74', preferably into abutting relationship with the shoulder formed by the collar 101 and secured in position by the annular spring 77.

With the head portion structure of FIGURE 15, the sleeve 74' can readily be removed and replaced to facilitate the removal of lime deposits from the cooling chamber 71. In addition, by covering the portion of the head member 36' ahead of the collar 108 with insulating material, spurious arcing in this area between the head member 36' and the sleeve 74' is eliminated.

To operate the welding gun, the tip of the electrode 25 is aimed at the area to be welded and the trigger 43 is pressed closing the contact points 86 of the switch 85 which, via leads 87 shown diagrammatically, turns on the welding current circuit and energizes the electrode feeding machine. The electrode 25 is fed through the gun, the tip of the electrode contacts the workpiece, and the welding arc is established. Referring to FIGURE 2. it will be noted that when the trigger 43 is pressed, the trigger comes in contact with the lever 45 before it comes in contact with the button 88 of the switch 85, thereby opening the gas valve 42 to flow gas to the welding area before the electrode is fed to establish the arc. Correspondingly, when pressure on the trigger 43 is released, the electrode feed is stopped and the arc is extinguished before the shielding gas is shut off. This pre-gas flow and retarded-gas flow action serves to prevent any oxidization of the weld metal at the start and at the finish of the welding operation.

While several specific forms of the present invention have been illustrated and described, it is to be understood that this is merely by way of example and in no manner to be construed as a limitation. It is contemplated that certain modifications may be made within the scope of the claims without departing from the spirit of the invention. For example, several principal features of the present invention may be employed in a non-gas-shielding welding gun in which event some form of tubular protective member electrically insulated from the head assembly would normally be used to cover the head assembly in lieu of the gas nozzle.

What is claimed is:

1. In an arc welding gun for applying shielding gas and mechanically-fed consumable electrode to the welding area, the combination at the arc end of said gun comprising: an electrically-conductive, cylindrical head member adapted to form a portion of the welding current-circuit and having a longitudinal bore; an electrically-conductive current contact member having a portion slidably inserted into said head member bore, said current contact member having a longitudinal bore for guiding said electrode and for providing electrical contact with said electrode, said inserted portion of said current contact member having a longitudinal recess in its outer surface with a portion of said recess intersecting said current contact member bore so as to expose said consumable electrode; a leaf spring mounted in said recess such that one portion of said leaf spring forces said inserted portion of said current contact member against a portion of the wall of said head member bore and such that another portion of said leaf spring urges said exposed consumable electrode into sliding contact with a portion of the wall of said member bore whereby said inserted portion of said current contact member is firmly held in said head member bore and whereby electrical contact with said electrode is established and maintained in a positive manner; a pair of annular bushings of electrical insulating material mounted in longitudinally-spaced relationship on said head member and protruding radially outwardly from said head member; a sleeve tightly mounted on said bushings so as to cooperate with said bushings and said head member to form an annular cooling chamber overlying said inserted portion of said current contact member, said head member having a pair of conduits connected to said annular cooling chamber to enable circulation of coolant through said annular cooling chamber; a nozzle for directing said shielding gas in an annular stream about the welding arc, said nozzle having a rearward portion inserted over the outer surface of said sleeve and provided with a plurality of longitudinal, circumferentially-spaced slots extending forwardly from the rearward portion of said nozzle; and an annular spring engaged about said radially-contractible rearward portion of said nozzle so as to maintain said nozzle tightly engaged on said outer surface of said sleeve whereby a heat transfer path is provided from said nozzle to said annular cooling chamber.

2. In an arc welding gun for applying shielding gas and mechanically-fed consumable electrode to the welding area, the combination at the arc end of said gun comprising: an electrically-conductive cylindrical head member adapted to form a portion of the welding current circuit and having a longitudinal bore; an electrically-conductive current contact member having a portion slidably inserted into said head member bore, said current contact member having a longitudinal bore for guiding said electrode and for obtaining electrical contact with said electrode; a compression spring interposed between said head member and said inserted portion of said current contact member so as to force said inserted portion of said current contact member against a portion of the wall of said head member bore whereby electrical contact is established and maintained between said head member and said current contact member and whereby said current contact member is firmly engaged in said head member bore; a pair of annular bushings of electrical insulating material mounted in longitudinally-spaced relationship on said head member and protruding radially outwardly from said head member; a sleeve tightly mounted on said bushings so as to cooperate with said bushings and said head member to form an annular cooling chamber overlying said inserted portion of said current contact member, said head member having a pair of conduits connected to said annular cooling chamber to enable circulation of coolant through said annular cooling chamber; a nozzle for directing said shielding gas in an annular stream about the welding arc, said nozzle having a rearward portion slidably inserted over the outer surface of said sleeve and provided with a plurality of longitudinal circumferentially-spaced slots extending forwardly from the rearward edge of said nozzle so as to enable radial contraction of said rearward portion of said nozzle; and an annular spring engaged about said radially-contractible rearward portion of said nozzle so as to maintain said nozzle tightly engaged on said outer surface of said tubular member whereby a heat transfer path is provided from said nozzle to said annular cooling chamber.

3. In an arc welding gun for applying mechanically-fed consumable electrode to the welding arc, the combination at the arc end of said gun comprising: an electrically-conductive, cylindrical head member adapted to form a portion of the welding current circuit and having a longitudinal bore; an electrically-conductive current contact member having a portion slidably inserted into said head member bore, said current contact member having a longitudinal bore for guiding said electrode and obtaining electrical contact with said electrode, said inserted portion of said current contact member having a longitudinal recess in its outer surface with a portion of said recess intersecting said current contact member bore so as to expose said electrode; a leaf spring mounted in said recess such that one portion of said leaf spring bears against and forces said inserted portion of said current contact member against a portion of the wall of said head member bore and such that another portion of said leaf spring urges said exposed electrode into sliding contact with a portion of the wall of said current contact member bore whereby said inserted portion of said current contact member is firmly engaged in said head member bore and whereby a welding current path is established and maintained from said head member to said electrode; a pair of annular bushings of electrical insulating material mounted in longitudinally-spaced relationship on said head member and protruding radially outwardly from said head member; and a sleeve securely mounted on said bushings so as to cooperate with said bushings and said head member to form an annular cooling chamber overlying said inserted portion of said current contact member, said head member having a pair of conduits connected to said annular cooling chamber to enable circulation of coolant through said annular cooling chamber.

4. In an arc welding gun for applying shielding gas and mechanically-fed consumable electrode to the welding arc, the combination comprising: an electrically-conductive, cylindrical head member adapted to form a portion of the welding current circuit; an electrically-conductive current contact member for guiding said electrode and for establishing welding current contact with said electrode, said current contact member having a major portion detachably secured within a longitudinal bore provided in said head member; a pair of annular bushings of electrical insulating material mounted in longitudinally-spaced relationship on said head member and protruding radially outwardly from said head member; a sleeve tightly mounted on said bushings so as to cooperate with said bushings and said head member to form an annular cooling chamber overlying said major portion of said current contact member, said head member having a pair of conduits connected to said annular cooling chamber to enable circulation of coolant through said annular cooling chamber; a nozzle for directing said shielding gas in an annular stream about the welding arc, said nozzle having a rearward portion slidably inserted over the outer surface of said sleeve member and provided with a plurality of longitudinal circumferentially-spaced slots extending forwardly from the rearward edge of said nozzle so as to enable radial contraction of said rearward portion of said nozzle; and an annular spring engaged about said radially-contractible rearward portion of said nozzle so as to maintain said nozzle tightly engaged on said outer surface of said tubular member whereby a heat transfer path is provided from said nozzle to said annular cooling chamber.

5. In an arc welding gun for applying shielding gas and mechanically-fed consumable electrode to the welding arc, the combination comprising: an electrically-conductive, cylindrical head member adapted to form a portion of the welding current circuit and having a longitudinal bore; an electrically-conductive current contact member having a portion slidably inserted into said head member bore, said current contact member having a longitudinal bore for guiding said electrode and obtaining electrical contact with said electrode; a compression spring interposed between said head member and said inserted portion of said current contact member so as to force said inserted portion of said current contact member against a portion of the wall of said head member bore such that firm heat-and-current-conductive contact is established and maintained between said head member and said current contact member and such that said current contact member is firmly held in said head member bore; a pair of annular bushings of electrical insulating material mounted in longitudinally-spaced relationship on said head member and protruding radially outwardly from said head member; and a sleeve tightly mounted on said bushings so as to cooperate with said bushings and said head member to form an annular cooling chamber overlying said inserted portion of said current contact member, said head member having a pair of conduits connected to said annular cooling chamber to enable circulation of coolant through said annular cooling chamber.

6. In an arc welding gun for applying mechanically-fed consumable electrode to the welding arc, the combination at the arc end of said gun comprising: an electrically-conductive head member adapted to form a portion of the welding current circuit and having a longitudinal bore; an electrically conductive current contact member having a portion slidably inserted into said head member bore, said current contact member having a longitudinal bore for guiding said electrode and for obtaining electrically-conductive contact with said electrode, said inserted portion of said current contact member having a longitudinal recess in its outer surface with a portion of said recess intersecting said current contact member bore so as to expose said electrode; a leaf spring mounted in said recess such that one portion of said leaf spring forces said inserted portion of said current contact member against a portion of the wall of said head member bore and such that another portion of said leaf spring urges said exposed electrode into sliding contact with a portion of the wall of said current contact member bore, whereby said inserted portion of said current contact member is firmly held in said head member bore and whereby a welding current path from said head member to said electrode is established and maintained.

7. In an arc welding gun for applying mechanically-fed consumable electrode to the welding arc, the combination at the arc end of said gun comprising: an electrically-conductive, cylindrical head member adapted to form a portion of the welding current circuit and having a longitudinal bore; an electrically-conductive, cylindrical current contact member having a portion telescoped within said head member bore, said current contact member having a longitudinal bore for guiding said electrode and for obtaining electrical contact with said electrode; and a leaf spring mounted in a longitudinal groove provided in said telescoped portion of said current contact member so as to force said inserted portion of said current contact member against a portion of the wall of said head member bore such that firm heat-and-current-conductive contact is established and maintained between said current contact member and said head member and such that said inserted portion of said current contact member is firmly held in said head member bore.

8. In an arc welding gun for applying mechanically-fed consumable electrode to the welding arc, the combination comprising: an electrically-conductive head member adapted to form a portion of the welding current circuit and having a longitudinal bore; an electrically-conductive current contact member having a major portion slidably inserted into said head member bore, said current contact member having a longitudinal bore for guiding said electrode and for obtaining electrical contact with said electrode; and a compression spring mounted in a recess provided in said inserted portion of said current contact member so as to force said inserted portion of said current contact member against a portion of the wall of said head member bore such that a firm heat-and-current-conductive contact is established and maintained between said current contact member and said head member and such that said inserted portion of said current contact member is firmly held in said head member bore.

9. In an arc welding gun for applying mechanically-fed consumable electrode to the welding arc, the combination comprising: an electrically-conductive head member adapted to form a portion of the welding current circuit and having a longitudinal bore; an electrically-conductive current contact member having a portion slidably inserted into said head member bore, said current contact member having a longitudinal bore for contact with said electrode; and compression spring means interposed between said head member and said inserted portion of said current contact member for forcing said inserted portion of said current contact member against a portion of the wall of said head member bore such that firm heat-and-current-conductive contact is established and maintained between said current contact member and said head member and such that said inserted portion of said current contact member is firmly held in said head member bore.

10. In an arc welding gun for applying mechanically-fed consumable electrode to the welding arc, the combination at the arc end of said gun comprising: an electrically-conductive current contact member adapted to form a portion of the welding current circuit and having a longitudinal bore for guiding said electrode and for obtaining electrical contact with said electrode; and a leaf spring mounted in a longitudinal groove provided in said current contact member so as to urge said electrode against a portion of the wall of said current contact member bore whereby positive electrical contact is established and maintained between said electrode and said current contact member as said electrode travels through said current contact member bore.

11. In an arc welding gun for applying mechanically-fed consumable electrode to the welding arc, the combination at the arc end of said gun comprising: an electrically-conductive current contact member adapted to form a portion of the welding current circuit and having a longitudinal bore for guiding said electrode and for obtaining electrical contact with said electrode; and a compression spring mounted in a recess provided in said current contact member so as to urge said electrode against a portion of the wall of said current contact member bore whereby positive electrical contact is established and maintained between said electrode and said current contact member as said electrode travels through said current contact member bore.

12. In an arc welding gun for applying mechanically-fed consumable electrode to the welding arc, the combination comprising: an electrically-conductive current contact member adapted to form a portion of the welding current circuit and having a longitudinal bore for guiding said electrode and for obtaining electrical contact with said electrode; and compression spring means for urging said electrode against a portion of the wall of said current contact member bore whereby positive electrical contact is established and maintained between said electrode and said current contact member as said electrode travels through said current contact member bore.

13. In an arc welding gun for applying mechanically-fed consumable electrode to the welding arc, the combination comprising: an electrically-conductive, cylindrical head member adapted to form a portion of the welding current circuit; an electrically-conductive current contact member having a longitudinal bore therethrough for guiding said consumable electrode and for obtaining welding current contact with said consumable electrode, said current contact member having a major portion detachably secured within a longitudinal bore provided in said head member; a pair of annular bushings of electrical insulating material mounted in longitudinally-spaced relationship on said head member and protruding radially outwardly from said head member; a thin-walled sleeve securely mounted on said bushings so as to cooperate with said bushings and said head member to form an annular cooling chamber which overlies said major portion of current contact member; and a pair of O rings mounted on said head member for sealing the ends of said annular cooling chamber, said head member having a pair of conduits connected to said annular cooling chamber to enable circulation of coolant through said annular cooling chamber.

14. The combination defined in claim 13 wherein said thin-walled sleeve is provided with one or more detents engaged in one or more annular grooves in said bushings to resist axial dislocation of said sleeve.

15. In an arc welding gun for applying mechanically-fed consumable electrode to the welding arc, the combination comprising: an electrically-conductive, cylindrical head member adapted to form a portion of the welding current circuit; an electrically-conductive current contact member for guiding said consumable electrode and for establishing welding current contact with said consumable electrode, said current contact member having a portion detachably secured to said head member; a first externally-threaded bushing of electrical insulating material mounted between a first collar and a second collar provided on said head member in the rearward portion thereof, said first bushing protruding radially beyond the outermost surfaces of said head member; a first O ring mounted ahead of said first bushing between said second collar and a third collar provided on said head member; a second O ring confined between second and third annular bushings of electrical insulating material mounted on said head member ahead of a fourth collar provided on the forward portion of said head member, said second and third bushings protuding radially from said head member; and a thin-walled sleeve adapted to be threaded onto said first bushing, and provided with an inwardly-extending annular flange at its forward end for bearing rearwardly against said third bushing when said thin-walled sleeve is threaded onto said first bushing, said thin-walled sleeve cooperating with said head member and said first and second bushings when threaded onto said first bushing to form an annular cooling chamber sealed at its ends by said first and second O rings, said head member having a pair of conduits communicating with said annular cooling chamber to enable circulation of coolant through said annular cooling chamber.

16. In an arc welding gun for applying mechanically-fed consumable electrode to the welding arc, the combination comprising: an electrically-conductive, cylindrical head member adapted to form a portion of the welding current circuit; an electrically-conductive current contact member for guiding said consumable electrode and for establishing welding current contact with said consumable electrode, said current contact member having a portion detachably secured to said head member; a pair of annular bushings of electrically non-conductive material mounted in longitudinally-spaced relationship on said head member and protruding radially outwardly from said head member; and a sleeve tightly mounted on said bushings so as to cooperate with said bushings and said head member to form an annular cooling chamber, said head member having a pair of conduits communicating with said annular cooling chamber to enable circulation of coolant through said annular cooling chamber.

17. The combination defined in claim 16 wherein said bushings are cemented in annular recesses provided in said head member, thereby sealing the ends of said annular cooling chamber.

18. In an arc welding gun for applying shielding gas and mechanically-fed consumable electrode to the welding area, the combination at the arc end of said gun comprising: a head assembly for guiding said consumable electrode and establishing welding current contact with said consumable electrode, said head assembly presenting a cylindrical outer surface overlying an annular cooling chamber provided in said head assembly; a nozzle for directing said shielding gas in an annular stream about the welding arc, said nozzle having a rearward portion slidably inserted onto said cylindrical outer surface of said head assembly and provided with a plurality of longitudinal, circumferentially-spaced slots extending forwardly from the rearward edge of said nozzle so as to enable radial contraction of said rearward portion of said nozzle; and an annular spring having an unstressed diameter smaller than the non-contracted diameter of said radially-contractible rearward portion of said nozzle, said annular spring being engaged in an annular groove provided in the rearward end of said radially-contractible rearward portion of said nozzle so as to maintain said nozzle tightly engaged on said cylindrical outer surface of said head assembly.

19. In an arc welding gun for applying shielding gas and mechanically-fed consumable electrode to the welding area, the combination comprising: a head assembly for guiding said consumable electrode and establishing welding current contact with said electrode, said head assembly presenting a cylindrical outer surface; a nozzle for directing said shielding gas in an annular stream about the welding arc, said nozzle having a rearward portion slidably inserted onto said cylindrical outer surface of said head member and provided with a plurality of longitudinal circumferentially-spaced slots extending forwardly from the rearward portion of said nozzle; and an annular spring engaged about said radially-contractible rearward portion of said nozzle so as to maintain said nozzle tightly engaged on said cylindrical outer surface of said head assembly.

References Cited by the Examiner

UNITED STATES PATENTS

| | | | |
|---|---|---|---|
| 2,379,470 | 7/1945 | Baird | 219—136 |
| 2,727,971 | 12/1955 | Mowry | 219—136 |
| 2,872,563 | 2/1959 | Thorp et al. | 217—75 |
| 2,966,575 | 12/1960 | Lilly | 219—75 |
| 3,007,032 | 10/1961 | Whiteman | 217—130 |
| 3,155,811 | 11/1964 | Adamson et al. | 219—130 |

RICHARD M. WOOD, *Primary Examiner.*